United States Patent
Venkataramana et al.

(10) Patent No.: US 11,605,303 B2
(45) Date of Patent: Mar. 14, 2023

(54) FLIGHT PLANNING OPERATIONS USING CONNECTED DATA

(71) Applicant: HONEYWELL INTERNATIONAL INC., Charlotte, NC (US)

(72) Inventors: Kiran Mancheiah Venkataramana, Charlotte, NC (US); Mohan Gowda Chandrashekarappa, Charlotte, NC (US); Saikrishna Nadipalli, Charlotte, NC (US); Seemakruthi Sahithya, Charlotte, NC (US); Vijaykumar Patil, Charlotte, NC (US); Fiyaz Chaneparambil Razack, Charlotte, NC (US); Purushothama C, Charlotte, NC (US)

(73) Assignee: Honeywell International Inc., Morris Plains, NJ (US)

( * ) Notice: Subject to any disclaimer, the term of this patent is extended or adjusted under 35 U.S.C. 154(b) by 100 days.

(21) Appl. No.: 17/173,903

(22) Filed: Feb. 11, 2021

(65) Prior Publication Data

US 2021/0256856 A1     Aug. 19, 2021

(30) Foreign Application Priority Data

Feb. 14, 2020   (IN) .............................. 202011006436

(51) Int. Cl.
    *G08G 5/00*         (2006.01)
    *G01C 21/34*       (2006.01)

(52) U.S. Cl.
    CPC ....... *G08G 5/0034* (2013.01); *G01C 21/3469* (2013.01); *G08G 5/0021* (2013.01)

(58) Field of Classification Search
    CPC ............... G08G 5/0034; G08G 5/0021; G01C 21/3469; G06Q 10/047
See application file for complete search history.

(56) References Cited

U.S. PATENT DOCUMENTS

| | | | |
|---|---|---|---|
| 2010/0191458 A1* | 7/2010 | Baker | G06Q 30/0601 705/40 |
| 2011/0099022 A1* | 4/2011 | Stochniol | G07C 5/008 705/1.1 |

(Continued)

FOREIGN PATENT DOCUMENTS

| | | |
|---|---|---|
| EP | 3373273 A1 | 9/2018 |
| EP | 3467729 A1 | 4/2019 |

OTHER PUBLICATIONS

H. K. Ng, B. Sridhar, S. Grabbe and N. Chen, "Cross-polar aircraft trajectory optimization and the potential climate impact," 2011 IEEE/AIAA 30th Digital Avionics Systems Conference, 2011, pp. 3D4-1-3D4-15, doi: 10.1109/DASC.2011.6096060) (Year: 2011).*

(Continued)

*Primary Examiner* — Shon G Foley
(74) *Attorney, Agent, or Firm* — Alston & Bird LLP

(57) ABSTRACT

Methods, apparatuses, systems, and computer program products are disclosed for determining a flight plan. An example method includes determining one or more potential flight plans from an originating location to a destination location, each potential flight plan comprising a different combination of one or more flight plan segments forming a potential flight plan from the originating location to the destination location. The method further includes calculating a projected cost for each of the one or more potential flight plans wherein the projected cost is based at least in part on dynamic cost data, dynamic navigation data, or a combination thereof. The method further includes determining an optimal flight plan from among the one or more potential flight plans, the optimal flight plan having a lowest aggregate cost of the calculated projected costs associated with each of the one or more potential flight plans.

20 Claims, 6 Drawing Sheets

(56) References Cited

U.S. PATENT DOCUMENTS

2017/0016399 A1* 1/2017 Bedrine ................ B64D 27/10
2019/0361463 A1* 11/2019 Nelson ................ G06F 16/9537
2021/0012669 A1* 1/2021 Beaurepaire ........... G08G 5/006

OTHER PUBLICATIONS

Extended European Search Report issued in European Application No. 21156719.3 dated Jul. 6, 2021, 9 pages.

* cited by examiner

FLIGHT PLANNING OPERATIONS USING CONNECTED DATA

CROSS-REFERENCE TO RELATED APPLICATIONS

This application claims priority pursuant to 35 U.S.C. 119(a) of India Patent Application No. 202011006436, filed Feb. 14, 2020, which application is incorporated herein by reference in its entirety.

TECHNICAL FIELD

The present application relates generally to aircraft navigation, and more particularly, to a method, apparatus, system, and computer program product for determining an aircraft flight plan using connected data.

BACKGROUND

Conventional methods and systems are available for determining a flight plan for an aircraft. Applicant has identified a number of deficiencies and problems associated with conventional methods and systems for determining a flight plan. For example, flight plans constructed utilizing such conventional methods and systems are typically based upon time, distance, and/or fuel considerations. Such conventional methods and systems suffer due to their inability to account for increased operational costs incurred as a result of an aircraft traversing such flight plans. Through applied effort, ingenuity, and innovation, many of these identified problems have been solved by developing solutions that are included in embodiments of the present disclosure, many examples of which are described in detail herein.

BRIEF SUMMARY

Apparatuses, systems, computer program products and corresponding methods for determining a flight plan for an aircraft using connected data are therefore provided. In one example embodiment, a method for determining a flight plan for an aircraft comprises determining one or more potential flight plans from an originating location to a destination location, each potential flight plan comprising a different combination of one or more flight plan segments forming a potential flight plan from the originating location to the destination location; calculating a projected cost for each of the one or more potential flight plans, wherein the projected cost is based at least in part upon dynamic cost data, dynamic navigation data, or a combination thereof; and determining an optimal flight plan from among the one or more potential flight plans, the optimal flight plan having a lowest aggregate cost of the calculated projected costs associated with each of the one or more potential flight plans. In certain embodiments, calculating the projected cost for each of the one or more potential flight plan sequences comprises accessing cost data associated with each of the one or more flight plan segments; determining flight-specific cost data associated with each of the one or more flight plan segments based upon at least the cost data; and for each of the one or more potential flight plans, aggregating the flight-specific cost data associated with each of the one or more flight plan segments forming such potential flight plan.

In some embodiments, accessing cost data associated with each of the one or more flight plan segments comprises querying an operating cost repository based upon at least one or more of the originating location, the destination location, one or more waypoints associated with each of the one or more flight plan segments, and equipment data. In certain embodiments, accessing cost data associated with each of the one or more flight plan segments comprises determining whether a cost exception is satisfied such that accessing cost data associated with each of the one or more flight plan segments comprises accessing subsidized cost data associated with each of the one or more flight plan segments. In still further embodiments, a cost exception is satisfied in an instance where an entity associated with the aircraft is associated with a privilege classification. In certain embodiments, a cost exception is not satisfied in an instance where an entity associated with the aircraft is not associated with a privilege classification.

In some embodiments, determining flight-specific cost data associated with each of the one or more flight plan segments comprises accessing navigation data associated with the aircraft; calculating an adjusted cost data value for each of the one or more flight plan segments based upon at least the cost data and the navigation data; and assigning the adjusted cost data value as the flight-specific cost data associated with each of the one or more flight plan segments.

In certain embodiments, the cost data comprises at least one of airspace usage data, pollution data, airport usage data, and equipment usage data. In some embodiments, the pollution data comprises at least one of carbon dioxide emissions data and noise emissions data. In still further embodiments, the navigation data comprises at least one of cost of fuel, estimated fuel usage, and actual fuel usage.

In some embodiments, calculating an adjusted cost data value for each of the one or more flight plan segments comprises accounting for changes in carbon dioxide emissions charges associated with one or more changes in an altitude of the aircraft. In certain embodiments, a first flight segment is associated with an increase in the altitude of the aircraft and a second flight segment is associated with no change in the altitude of the aircraft, the estimated fuel usage associated with the first flight plan segment greater than the estimated fuel usage associated with the second flight plan segment.

In some embodiments, calculating an adjusted cost data value for each of the one or more flight plan segments comprises accounting for carbon dioxide emissions charges associated with time of year data. In still further embodiments, calculating an adjusted cost data value for each of the one or more flight plan segments comprises accounting for noise emissions charges associated with time of day data. In certain embodiments, the navigation data comprises equipment data and calculating an adjusted cost data value for each of the one or more flight plan segments comprises accounting for a performance variable corresponding to equipment associated with the aircraft. In still further embodiments, the performance variable corresponds to actual noise emission levels associated with one or more engines associated with the aircraft.

In some example embodiments, the method further comprises displaying a visual representation of the optimal flight plan to a user interface. In certain embodiments, the visual representation of the optimal flight plan is displayed in conjunction with at least one other flight plan corresponding to a shortest distance between the originating location and the destination location, the method further comprising receiving user input indicating a user selection of the optimal flight plan.

In some embodiments, the originating location is a current location of the aircraft traversing an existing flight plan, the existing flight plan is different than the optimal flight plan, and the method further comprises receiving input indicating a selection of the optimal flight plan such that the aircraft halts traversing the existing flight plan and commences traversing the selected optimal flight plan.

Some example embodiments are directed to an apparatus configured to determine a flight plan for an aircraft, the apparatus comprising at least one processor and at least one non-transitory memory including program code, the at least one non-transitory memory and the program code configured to, with the processor, cause the apparatus to at least determine one or more potential flight plans from an originating location to a destination location, each potential flight plan comprising a different combination of one or more flight plan segments forming a potential flight plan from the originating location to the destination location; calculate a projected cost for each of the one or more potential flight plans wherein the projected cost is based at least in part on dynamic cost data, dynamic navigation data, or a combination thereof; and determine an optimal flight plan from among the one or more potential flight plans, the optimal flight plan having a lowest aggregate cost of the calculated projected costs associated with each of the one or more potential flight plans.

Still other example embodiments are directed to a computer program product comprising at least one non-transitory computer-readable storage medium having computer-readable program code portions stored therein, the computer-readable program code portions comprising an executable portion configured to determine one or more potential flight plans from an originating location to a destination location, each potential flight plan comprising a different combination of one or more flight plan segments forming a potential flight plan from the originating location to the destination location; calculate a projected cost for each of the one or more potential flight plans wherein the projected cost is based at least in part on dynamic cost data, dynamic navigation data, or a combination thereof; and determine an optimal flight plan from among the one or more potential flight plans, the optimal flight plan having a lowest aggregate cost of the calculated projected costs associated with each of the one or more potential flight plans.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

DETAILED DESCRIPTION

Figure 1:
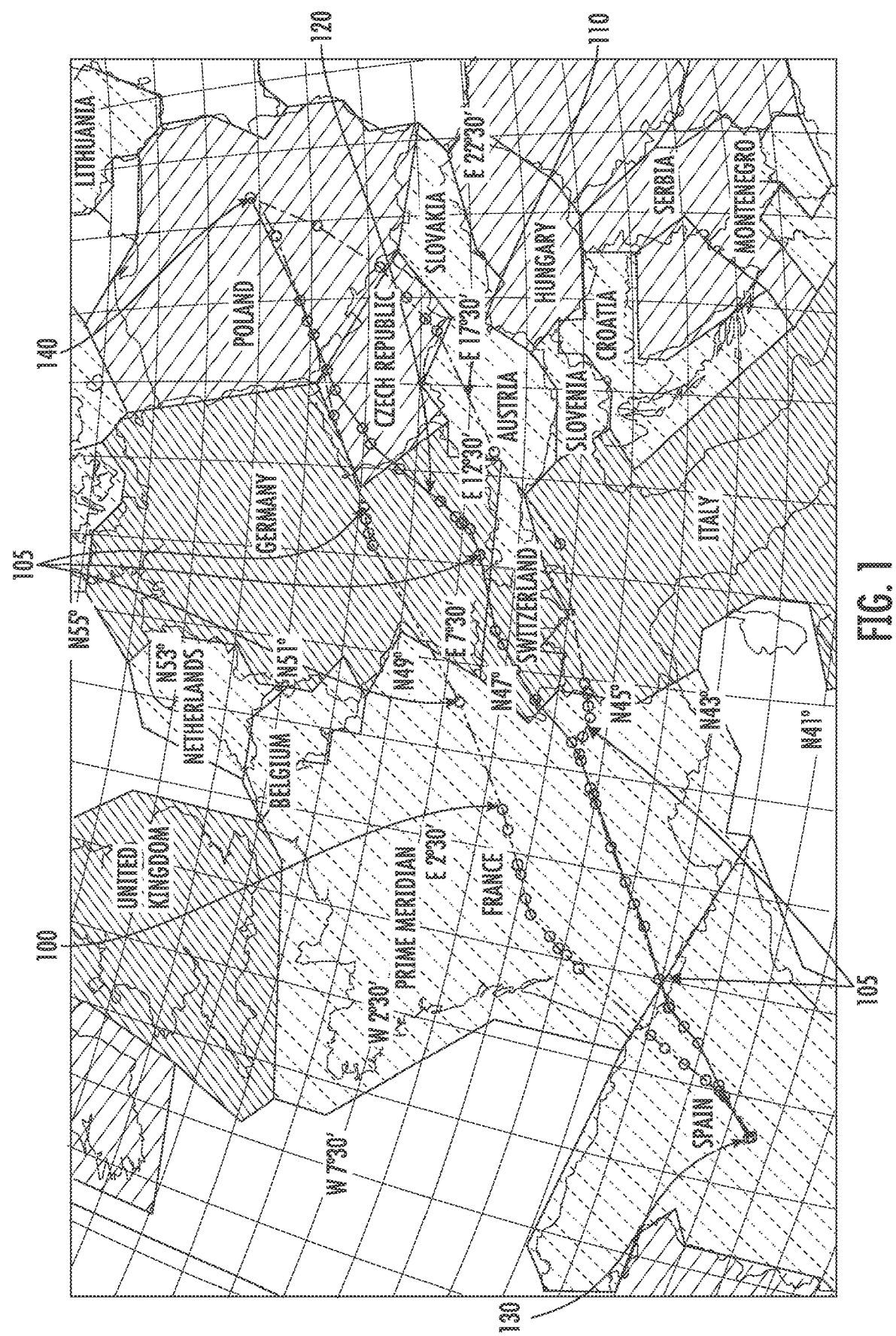
FIG. 1 illustrates an example flight plan generated by example embodiments of the subject disclosure.

One or more embodiments are now more fully described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a flight management server as an example "apparatus." However, elements of the apparatus described herein may be equally applicable to the claimed method and computer program product. Thus, use of any such terms should not be taken to limit the spirit and scope of embodiments of the present invention.

Definitions

As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

The phrases "in one embodiment," "according to one embodiment," "in some embodiments," and the like generally refer to the fact that the particular feature, structure, or characteristic following the phrase may be included in the at least one embodiment of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the terms "flight management server," "flight management system," "flight planning aid," and the like may refer to computer hardware that is configured (either physically or by the execution of software) to determine or generate one or more flight plans of the present disclosure and, among various other functions, is configured to directly, or indirectly, transmit and receive data. An example flight management server may refer to a computing device/system of an aircraft that may be, in whole or in part, supported by the aircraft during performance of a flight plan (e.g., during flight) and configured to facilitate operation thereof. Said differently, the flight management server may refer to the collection of processors, memories, sensors, dials, gauges, displays, and the like configured to control or facilitate operation of one or more processes of an aircraft. Furthermore, the flight management server may be housed, in some embodiments, entirely by the aircraft, while in other embodiments, the flight management server may include some or all elements located separate from the aircraft. An example flight management server may refer to a computing device/system configured for generating one or more flight plans for any number of aircraft. For example, the flight management server may refer to a computing device/system controlled by a flight dispatcher generating one or more flight plans for any number of aircraft. The flight management server may be configured to communicate with the other computing devices via Bluetooth, NFC, Wi-Fi, 3G, 4G, 5G, RFID protocols, and the like.

As used herein, the term "external device" refers to any object, device, or system which may be in network communication with the flight management server. For example, an external device may be an external server or computing device (e.g., associated with an airport, air traffic controller, or the like) that may request, receive, and/or provide data to or from one of the devices described above. By way of example, an external device may include a server associated with an airport that operates to transmit and receive flight plan data, navigation data, or the like to and from the flight management server (e.g., an aircraft).

As used herein, the term "operational cost repository" refers to a data structure, database, or repository configured to receive, store, manage, and transmit any of a variety of "cost data" associated with costs, fees, tariffs, taxes, and/or the like that may be incurred by an airline carrier during flight operations. Similarly, the "cost data" of the operational cost repository may refer to cost data associated with a flight plan and/or a flight plan segment (e.g., airspace usage charge data, airport charge data, pollution charge data, equipment charge data, and/or the like). The operational cost repository may be populated by accessing and/or retrieving cost data from an external device such as one or more repositories maintained by the airline carrier or by a third party(ies), such as airports, regulating authorities, governments, and/or the like. The data contained in the operational cost repository may be static data, dynamic data, or a combination of static and dynamic data. For example, the operational cost repository may be updated (e.g., continuously, periodically (e.g., every 2 minutes, 5 minutes, hour, day, etc.), and/or the like) with dynamic data indicative of the most current cost data, such as the most current airspace usage charge data, airport charge data, pollution charge data, equipment charge data, and/or the like. The operational cost repository may be accessible by one or more software applications of the flight management server. It will be appreciated that additional repositories, local or remote, may comprise data for use in determining a flight plan and/or calculating a projected cost for a potential flight plan.

As used herein, the term "navigation repository" refers to a data structure, database, or repository for storing navigation data, flight plan data, and/or the like. Similarly, the "navigation data" of the navigation repository may refer to data generated by or relevant to an aircraft (e.g., fuel data, velocity data, altitude data, weather data, airport data, equipment data, and/or the like). The data contained in the navigation repository may be static data, dynamic data, or a combination of static and dynamic data. For example, the navigation repository may be updated (e.g., continuously, periodically (e.g., every 2 minutes, 5 minutes, hour, day, etc.), and/or the like) with dynamic data indicative of the most current navigation data, such as the most current velocity data, altitude data, weather data, and/or the like. The navigation repository may be accessible by one or more software applications of a flight management server.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Overview

Currently, many existing methods and systems do not account for charges, fees, tariffs, taxes, and other related costs that are levied by various regulating authorities when assembling or defining a flight plan. For example, the government of a country may impose an airspace usage charge when an aircraft, as part of its flight plan, navigates through or otherwise utilizes the airspace controlled or operated by such country. In another example, airlines may incur pollution charges, such as a government imposing a fee for the carbon dioxide emissions caused by an aircraft while utilizing the airspace controlled or operated by such country. In still another example, an authority, such as the government of a country or the operator of an airport, may charge airport usage charges for utilizing such airport as an origin or destination airport. In still a further example, an authority may impose charges in order to account for, reduce, or otherwise mitigate noise pollution associated with an airport and such charges may be passed on to airlines operating aircraft flying into or out of such airports. Commercial airlines and related institutions have much invested in making their flight plans more cost-effective to reduce overall operating costs. Flight plans constructed utilizing conventional methods and systems are typically heavily reliant upon time, distance, and/or fuel considerations and do not allow airlines to account for such levied fees in advance of a flight. Instead, airlines typically receive billing of such charges post-flight and historically have not accounted for such charges in the determination of flight plans either pre-flight or during flight.

Determination of a cost-effective flight plan may be further complicated by the dynamic aspect of some of the charges incurred by an aircraft implementing a flight plan. For example, the amount of traffic at an airport may vary as a result of time of year, time of day, weather conditions, and the like and an airport usage charge associated with such airport may correlate to such changes in traffic. Similarly, an aircraft may produce varying amounts of carbon dioxide emissions when navigating a flight plan. For example, the amount of fuel burned and level of carbon dioxide emissions associated with a first flight plan segment corresponding to take-off (e.g. climbing to a cruising altitude) may be greater than a second flight plan segment corresponding to an aircraft operating at cruising altitude. In still another example, the type and age of aircraft equipment and components may alter such determinations.

Example embodiments of the present disclosure may determine and/or revise a flight plan of the aircraft that accounts for such costs that may be incurred. In this way, the inventors have identified solutions for reducing operating costs of an airline that were historically unavailable. In doing so, such example implementations confront and solve at least two technical challenges: (1) providing flight plans optimized for cost-efficiency (e.g., thereby lowering overall operating costs), and (2) providing more robust operating cost data for improved assessment and calculation of ticket prices, cargo fees, and similar charges to be imposed by an airline.

With reference to FIG. 1, potential flight plans 100, 110, 120 determined or generated by one or more embodiments of the present disclosure are illustrated. As shown, each potential flight plan 100, 110, 120 comprises a series of waypoints 105 defining a different combination of multiple flight plan segments (e.g. portions of the potential flight plan 100, 110, 120 between the series of waypoints 105) between an originating location 130 (e.g., a departure airport in Spain) and a destination location 140 (e.g., a destination airport in Poland), forming the respective potential flight plan.

Figure 4:
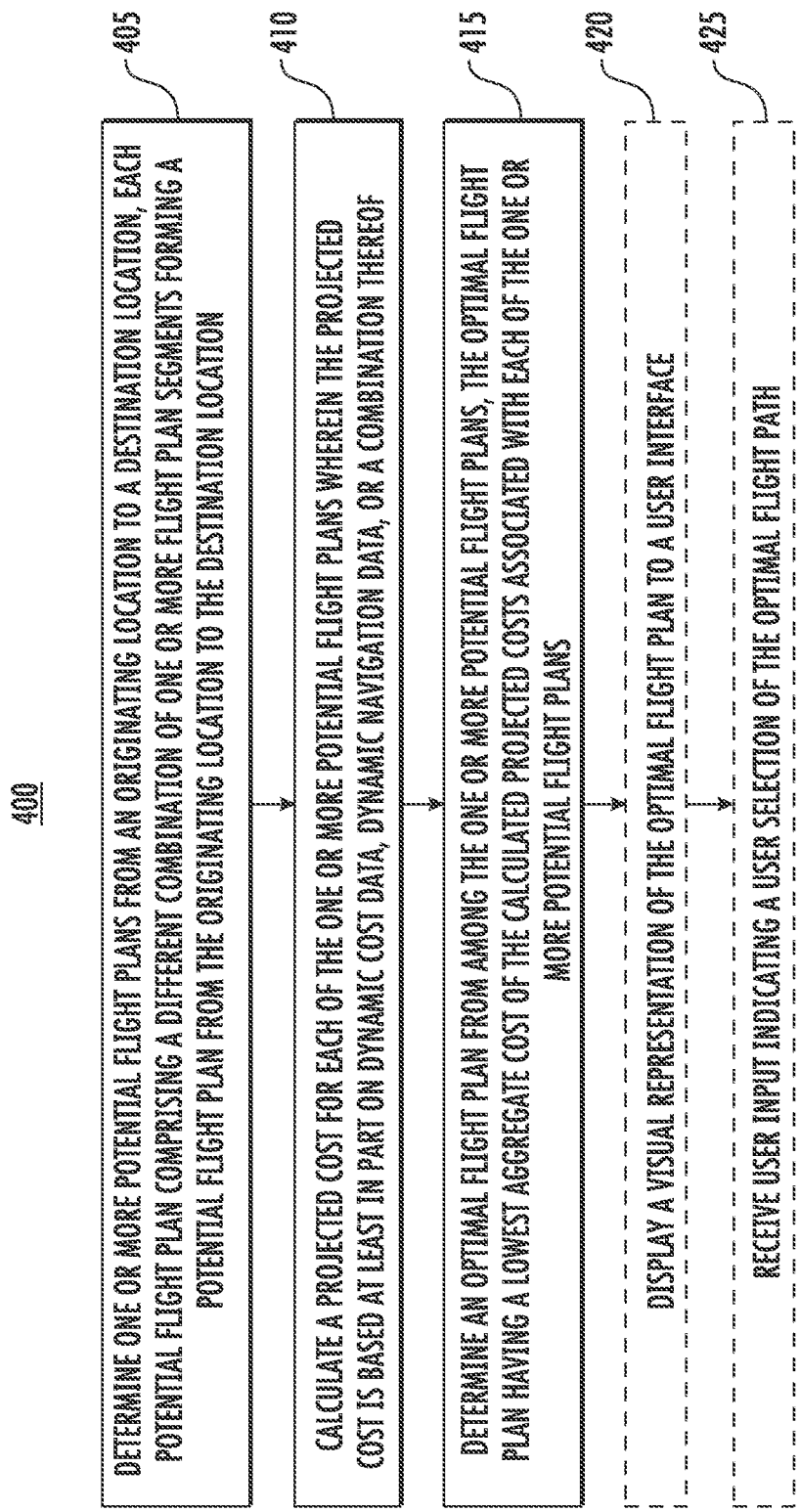
FIG. 4 is a flowchart illustrating example operations for determining a flight plan in accordance with various aspects and embodiments of the subject disclosure.
Figure 5:
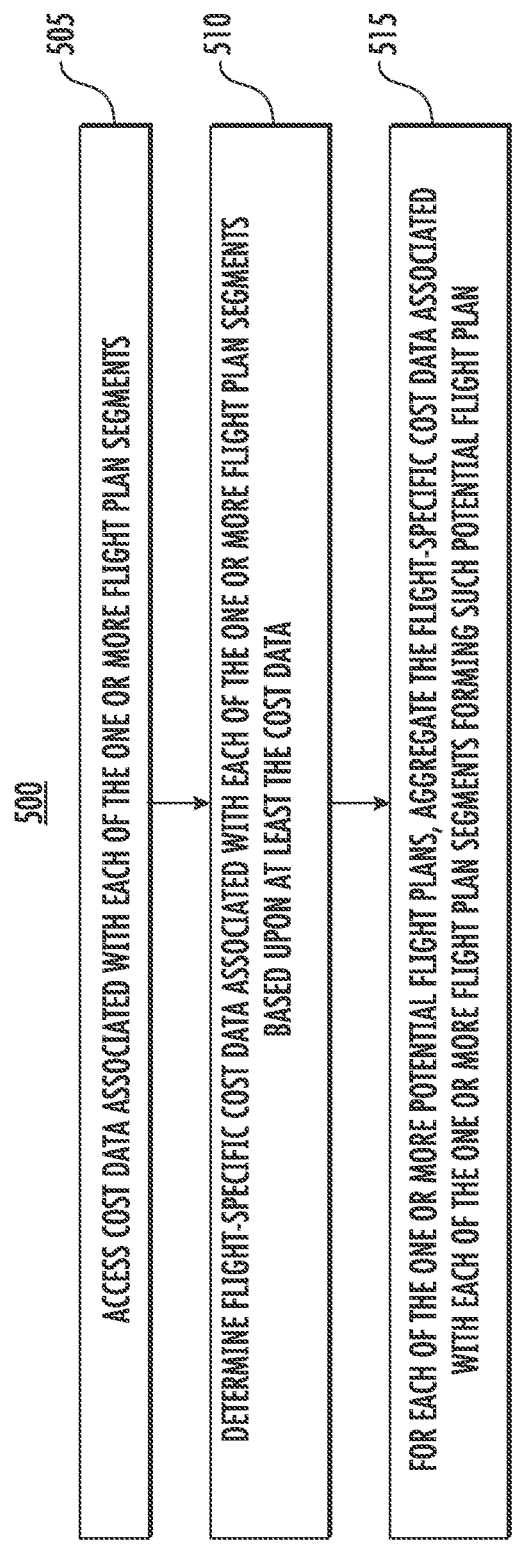
FIG. 5 is a flowchart illustrating example operations for calculating a projected cost associated with a potential flight plan in accordance with various aspects and embodiments of the subject disclosure; and, FIG. 6 is a flowchart illustrating example operations for determining flight-specific cost data in accordance with various aspects and embodiments of the subject disclosure.
Figure 6:
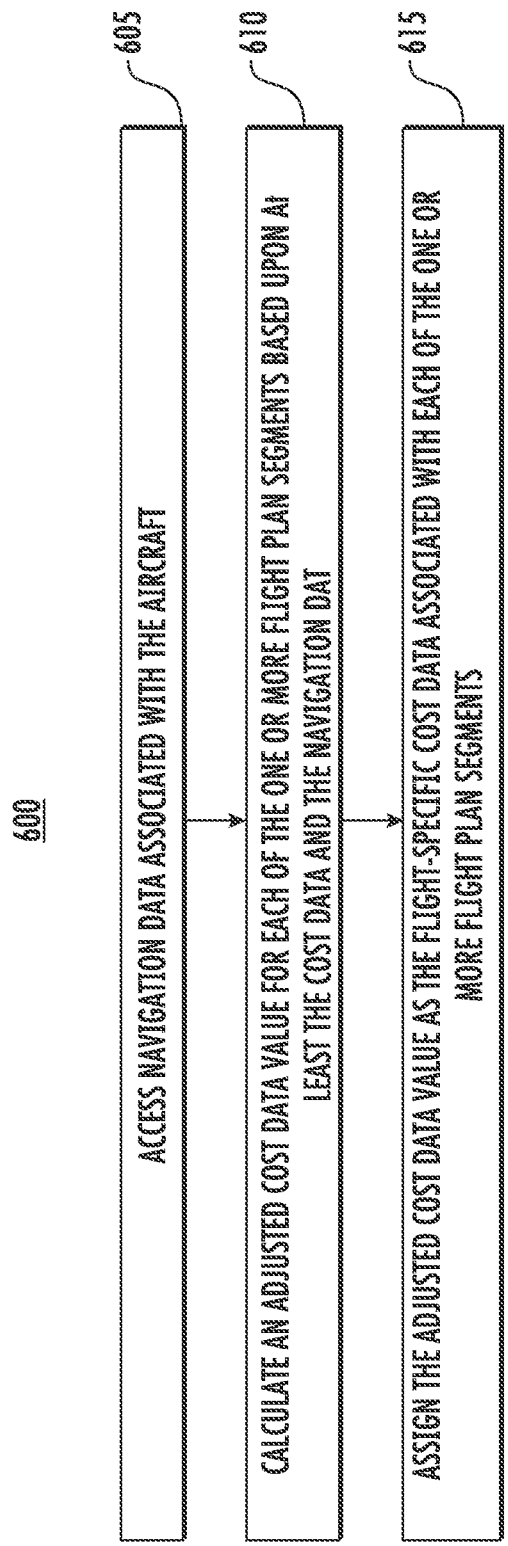

As described hereafter with reference to the methods of FIGS. 4-6, after determining one or more potential flight plans 100, 110, 120, embodiments disclosed herein calculate a projected cost for each of the one or more potential flight plans and select the optimal flight plan from among the one or more potential flight plans, the optimal flight plan having a lowest aggregate cost of the calculated projected costs associated with each of the one or more potential flight plans. In the non-limiting example depicted in FIG. 1, although flight plan 100 may be longer and less direct than potential flight plans 110, 120, flight plan 100 is the optimal flight plan for a selected aircraft as it demonstrates the lowest aggregate cost of the calculated projected costs associated with each of the potential flight plans 100, 110, 120, by avoiding airspace controlled by Switzerland. Said differently, in this non-limiting example, Switzerland imposes a greater airspace usage charge than compared to surrounding airspaces and the aggregate cost of the flight plan 100 is lesser than the potential flight plans 110, 120, even with the increased fuel usage and increased travel time.

As described hereafter, some embodiments disclosed herein are configured to evaluate any number of factors that may impact cost, such as airspace usage, pollution (e.g., noise, carbon dioxide emissions, etc.), airport usage (e.g., traffic conditions), equipment parameters (e.g., age, type, etc.), weather conditions, current time (e.g., time of year, time of day, etc.), and/or the like. The determination of an optimal flight plan may be based on static information, dynamic information, or a combination of static and dynamic information. Accounting for such cost impact factors in determining a flight plan can lead to a reduction in overall operating costs for an airline resulting in a significant benefit to the airline carrier.

Device Architecture and Example Apparatus

Figure 2:
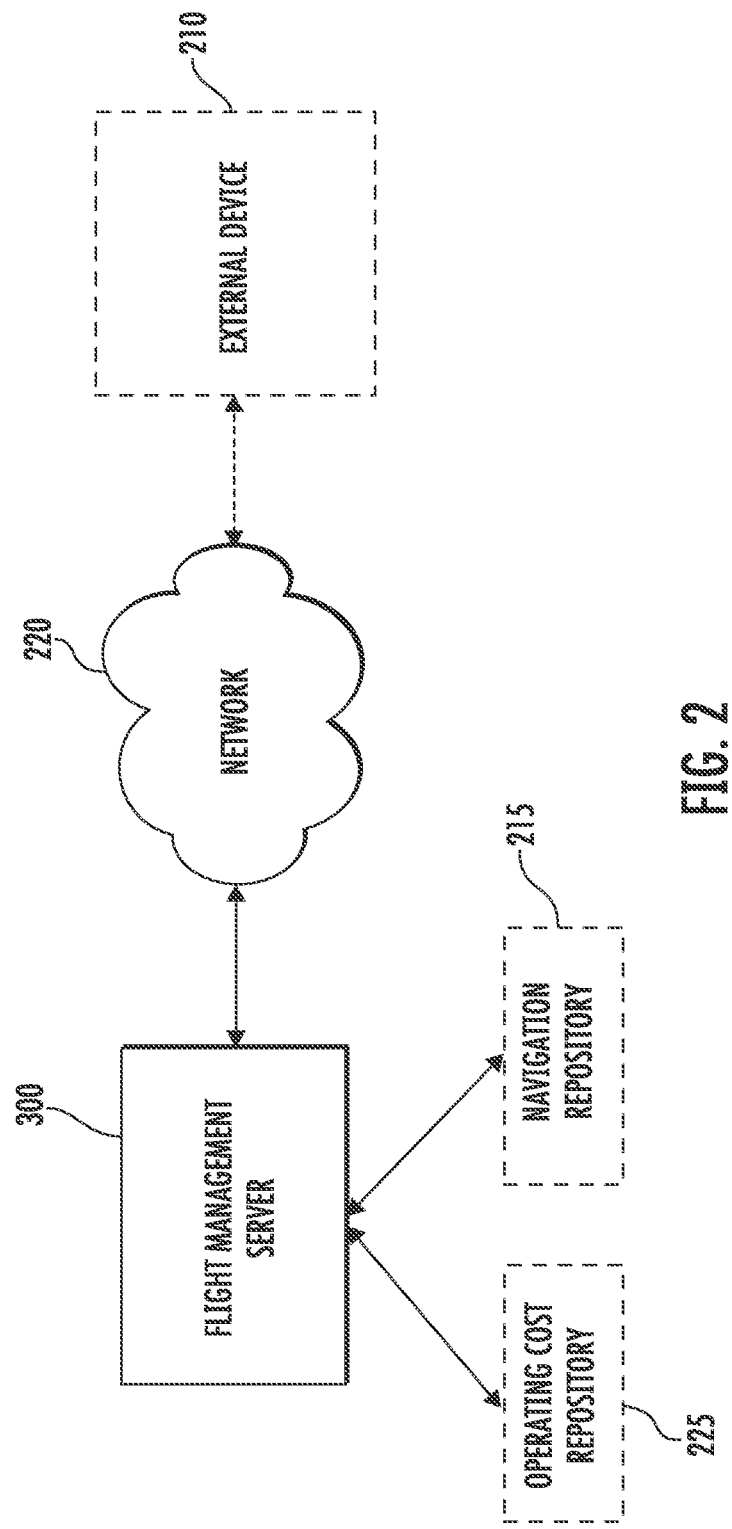
FIG. 2 illustrates a system diagram including devices that may be involved in some example embodiments described herein.

With reference to FIG. 2, an example system 200 is illustrated with an apparatus (e.g., a flight management server 300) communicably connected via a network 220 to an external device 210. The example system may also include a navigation repository 215 and/or an operating cost repository that may be hosted by the flight management server 300 or otherwise hosted by devices in communication with the flight management server 300.

The flight management server 300 may include circuitry, networked processors, or the like configured to perform some or all of the apparatus-based (e.g., flight management server-based) processes described herein, and may be any suitable network server and/or other type of processing device. In this regard, the flight management server 300 may be embodied by any of a variety of devices. For example, the flight management server 300 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 3 and described in connection therewith. In some embodiments, the flight management server 300 may be located remotely from the navigation repository 215, the operating cost repository 225, and/or external device 210, although in other embodiments, the flight management server 300 may comprise the external device 210, the navigation repository 215, and/or the operating cost repository 225. The flight management server 300 may, in some embodiments, comprise several servers or computing devices performing interconnected and/or distributed functions. Despite the many arrangements contemplated herein, the flight management server 300 is shown and described herein as a single computing device to avoid unnecessarily overcomplicating the disclosure.

The network 220 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 220 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 220 may include a public network, such as the Internet, a private network, such as an intranet, or combinations thereof, and may utilize a variety of networking protocols now available or later developed including, but not limited to TCP/IP based networking protocols.

The external device 210 may refer to any object, device, or system which may be in network communication with the flight management server 300. For example, an external device may be an external server or computing device (e.g., associated with an airport, air traffic controller, or the like) that may request, receive, and/or provide data to or from one of the devices described above. By way of example, the external device 210 may include a server associated with an airport that operates to transmit and receive flight plan data, navigation data, or the like to and from the flight management server 300. By way of another example, the external device 210 may include a server associated with an airport or regulating authority that operates to transmit cost data and/or the like to the flight management server 300. The external device 210 may include one or more computing devices, cellular telephones (e.g., a smartphone and/or other type of mobile telephone), laptops, tablets, electronic servers, or any combination of the above. Although only an external device 210 is illustrated, the example system 200 may include any number of external devices associated with the external entity or any number of respective entities.

The navigation repository 215 may be stored by any suitable storage device configured to store some or all of the information described herein (e.g., memory 302 of the flight management server 300 or a separate memory system separate from the flight management server 300, such as one or more database systems, backend data servers, network databases, cloud storage devices, or the like provided by another device (e.g., online application or 3rd party provider) or the external device 310). The navigation repository 215 may comprise data received from the flight management server 300 (e.g., via a memory 302 and/or processor(s) 301) or the external device 210, and the corresponding storage device may thus store this data.

The operating cost repository 225 may be stored by any suitable storage device configured to store some or all of the information described herein (e.g., memory 302 of the flight management server 300 or a separate memory system separate from the flight management server 300, such as one or more database systems, backend data servers, network databases, cloud storage devices, or the like provided by another device (e.g., online application or 3rd party provider) or the external device 310). The operating cost repository 225 may comprise data received from the flight management server 300 (e.g., via a memory 302 and/or processor(s) 301) or the external device 210, and the corresponding storage device may thus store this data.

Figure 3:
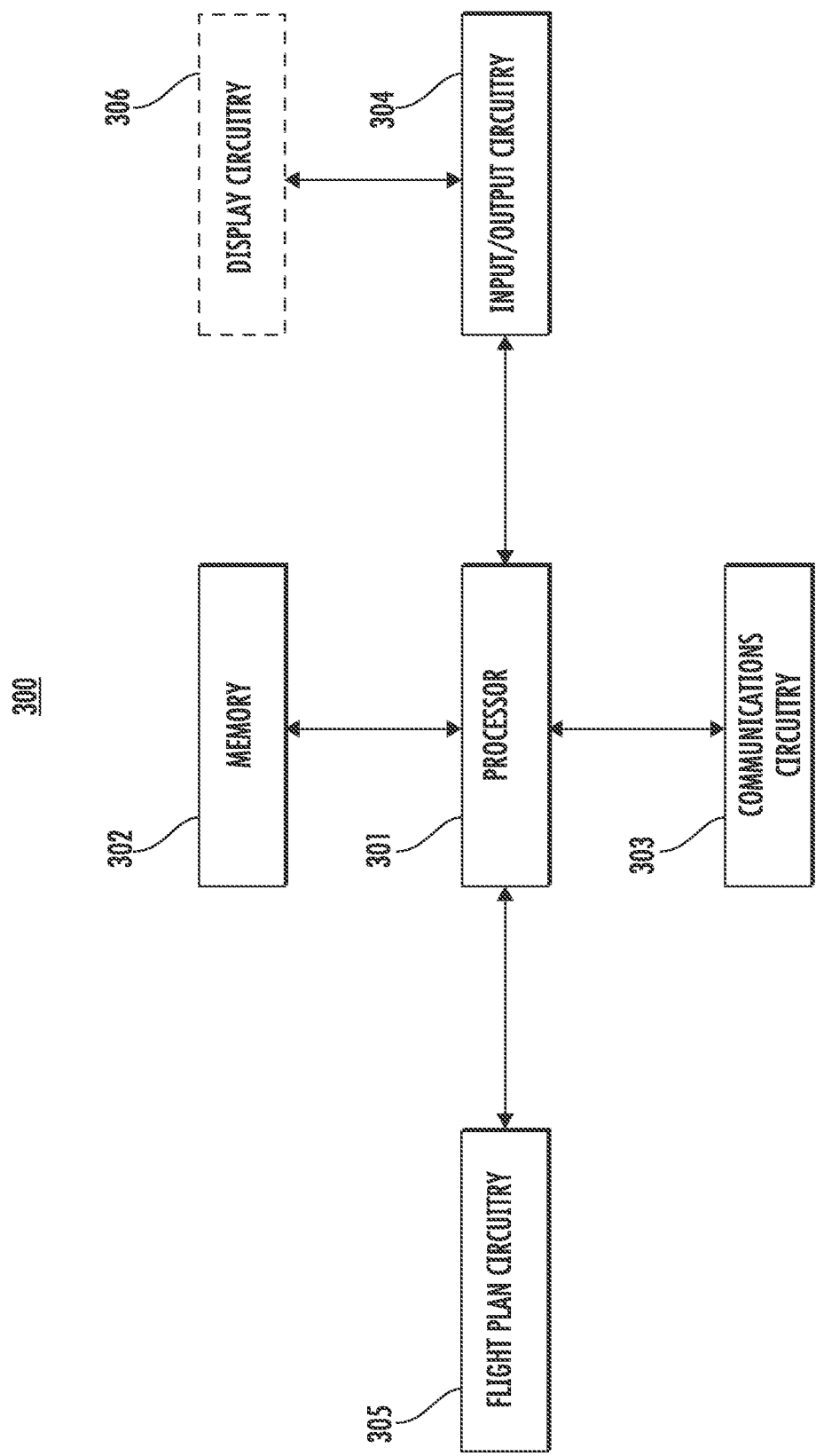
FIG. 3 a schematic block diagram of example circuitry that may perform various operations in accordance with various aspects and embodiments of the subject disclosure.

As illustrated in FIG. 3, the flight management server 300 may include a processor 301, a memory 302, communications circuitry 303, and input/output circuitry 304. Moreover, the flight management server 300 may include flight plan circuitry 305 and, in some embodiments, display circuitry 306. The flight management server 300 may be configured to execute the operations described below in connection with FIGS. 4-6. Although components 301-306 are described in some cases using functional language, it should be understood that the particular implementations necessarily include the use of particular hardware. It should also be understood that certain of these components 301-306 may include similar or common hardware. For example, two sets of circuitry may both leverage use of the same processor 301, memory 302, communications circuitry 303, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the flight management server 300 may be housed within the external device 310. It will be understood in this regard that some of the components described in connection with the flight management server 300 may be housed within one of these devices, while other components are housed within another of these devices, or by yet another device not expressly illustrated in FIG. 2.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the flight management server 300 may provide or supplement the functionality of particular circuitry.

In some embodiments, the processor 301 (and/or co-processor or any other processing circuitry assisting or otherwise associated with the processor) may be in communication with the memory 302 via a bus for passing information among components of the flight management server 300. The memory 302 may be non-transitory and may include, for example, one or more volatile and/or non-volatile memories. In other words, for example, the memory 302 may be an electronic storage device (e.g., a non-transitory computer readable storage medium). The memory 302 may be configured to store information, data, content, applications, instructions, or the like, for enabling the flight management server 300 to carry out various functions in accordance with example embodiments of the present disclosure.

The processor 301 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the flight management server, and/or remote or "cloud" processors. Accordingly, although illustrated in FIG. 3 as a single processor, in some embodiments, processor 301 comprises a plurality of processors. The plurality of processors may be embodied on a single server or may be distributed across a plurality of such devices collectively configured to function as the flight management server 300. The plurality of processors may be in operative communication with each other and may be collectively configured to perform one or more functionalities of flight management server 300 as described herein.

In an example embodiment, the processor 301 may be configured to execute instructions stored in the memory 302 or otherwise accessible to the processor 301. Alternatively, or additionally, the processor 301 may be configured to execute hard-coded functionality. As such, whether configured by hardware or by a combination of hardware with software, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the flight management server 300 may further include input/output circuitry 304 that may be in communication with processor 301 to provide output to a user and to receive input from a user, user device, or another source (e.g., an aircraft pilot). In this regard, the input/output circuitry 304 may, in some embodiments, comprise display circuitry 306 that may be manipulated by a mobile application and/or user. In some embodiments, the input/output circuitry 304 may also include additional functionality such as a keyboard, a mouse, a joystick, a touch screen, touch areas, soft keys, hard keys, a microphone, a speaker, or other input/output mechanisms. The processor 301 and/or user interface circuitry comprising the processor 301 may be configured to control one or more functions of a display through computer program instructions (e.g., software and/or firmware) stored on a memory accessible to the processor (e.g., memory 302, and/or the like).

The communications circuitry 303 may be any means such as a device or circuitry embodied in either hardware or a combination of hardware and software that is configured to receive and/or transmit data from/to a network and/or any other device, circuitry, or module in communication with the flight management server 300. In this regard, the communications circuitry 303 may include, for example, a network interface for enabling communications with a wired or wireless communication network. For example, the communications circuitry 303 may include one or more network interface cards, antennas, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the flight management server 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The flight plan circuitry 305 includes hardware components and/or software configured to support flight plan-related functionality of the flight management server 300. The flight plan circuitry 305 may utilize processing circuitry, such as the processor 301, to perform its corresponding operations, and may utilize memory 302 to store collected information. The flight plan circuitry 305 may send and/or receive data from an operating cost database 225 and/or a navigation repository 215. In some implementations, the sent and/or received data may include navigation data, such as fuel data, velocity data, altitude data, weather data, airport data, equipment data, and/or the like, and/or cost data, such as airspace usage charge data, airport charge data, pollution charge data, equipment charge data, and/or the like. In some embodiments, such data is utilized to calculate a projected cost for a potential flight plan. It should also be appreciated that, in some embodiments, the flight plan circuitry 305 may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of flight management server 300.

As described above and as will be appreciated based on this disclosure, embodiments of the present invention may be configured as systems, methods, computing devices, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Determination of an Optimal Flight Plan

FIG. 4 illustrates a flowchart containing a series of operations for determining a flight plan in accordance with some example embodiments described herein. The operations illustrated in FIG. 4 may, for example, be performed by, with the assistance of, and/or under the control of an apparatus (e.g., flight management server 300), as described above. In this regard, performance of the operations may invoke one or more of processor 301, memory 302, communications circuitry 303, input/output circuitry 304, flight plan circuitry 305, and/or display circuitry 306.

As shown in operation 405, the apparatus (e.g., flight management server 300) includes means, such as flight plan circuitry 305, communications circuitry 303, input/output circuitry 304, or the like, for determining one or more potential flight plans from an originating location 130 to a destination location 140. As illustrated in FIG. 1, each potential flight plan 100, 110, 120 comprises a different combination of one or more flight plan segments forming a potential flight plan from the originating location 130 (e.g., a departure airport in Spain) to the destination location 140 (e.g., a destination airport in Poland). In some example embodiments, the originating location 130 and/or the destination location 140 may be inputted, via the input/output circuitry 304, by a user (e.g. a pilot operating a specific aircraft or a flight dispatcher generating flight plans for any number of aircraft). By way of example, a flight dispatcher may desire to generate or otherwise determine one or more flight plans at a time well in advance of an actual flight, such as to develop flight schedules for a number of aircraft. By way of another example, a pilot operating an aircraft may desire determination of a new flight plan or modification of an existing flight plan to account for operating costs in real time or to otherwise account for a variety of circumstances (e.g., current weather conditions, air traffic conditions, delayed flight conditions, temporary closure of a given airspace, etc.) immediately prior to or during a flight. In some embodiments, the originating location 130 and/or the destination location 140 may be received automatically by the flight management server 300. In some instances, the destination location 140 may be set by a pre-existing flight plan provided by an airport or related aircraft navigation regulation. For example, the flight management server 300 may receive the destination location 140 from the external device 210 (e.g., an airport) via the network 220.

Thereafter, as shown in operation 410, the apparatus (e.g., flight management server 300) includes means, such as flight plan circuitry 305, or the like, for calculating a projected cost for each of the one or more potential flight plans, wherein the projected cost data is based at least in part on dynamic cost data, dynamic navigation data, or a combination thereof. As described hereafter with reference to FIG. 5, the projected cost for each of the one or more potential flight plans 100, 110, 120 may be calculated as the aggregate of the flight-specific cost data associated with each of the one or more flight plan segments forming such potential flight plan 100, 110, 120.

Thereafter, as shown in operation 415, the apparatus (e.g., flight management server 300) includes means, such as processor 301, flight plan circuitry 305, or the like for determining an optimal flight plan from among the one or more potential flight plans 100, 110, 120, the optimal flight plan having a lowest aggregate cost of the calculated projected costs associated with each of the one or more potential flight plans 100, 110, 120. In a non-limiting example, after calculating the projected cost for each of the one or more potential flight plans, such as by aggregating the flight-specific cost data associated with each of the one or more flight plan segments forming such potential flight plan, the apparatus (e.g., flight management server 300) may compare the projected cost associated with each potential flight plan, select the flight plan with the lowest aggregate cost (e.g., lowest total projected cost), and identify such flight plan as the optimal flight plan. In some embodiments, the apparatus (e.g., flight management server 300) may further identify one or more additional flight plans (e.g., 110, 120) with incrementally increasing aggregate costs.

Thereafter, as shown in operation 420, the apparatus (e.g., flight management server 300) includes means, such as the processor 301, input/output circuitry 304, flight plan circuitry 305, or the like, for optionally displaying a visual representation of the optimal flight plan to a user interface. Such visual representation may be displayed to a user interface associated with, for example, a pilot operating an aircraft or a flight controller. In some embodiments, the apparatus (e.g., flight management server 300) may further display one or more additional flight plans (e.g., 110, 120) with incrementally increased aggregate costs.

Thereafter, as shown in operation 425, the apparatus (e.g., flight management server 300) includes means, such as processor 301, input/output circuitry 304, or the like for optionally receiving user input indicating a user selection of the optimal flight plan. In some embodiments, the visual representation of the optimal flight plan is displayed in conjunction with at least one other flight plan, such as a flight plan corresponding to a shortest distance between the originating location and the destination location or a flight plan corresponding to a shortest time between the originating location and the destination location. In still other embodiments, the at least one other flight plan corresponds to a flight plan estimated to consume the least amount of fuel between the originating location and the destination location. Such embodiments provide varied flight plan options to a user (e.g., a pilot operating an aircraft, a flight controller, or the like) allowing the user to choose from the optimal flight plan corresponding to the lowest operating costs and other provided flight plan(s).

Turning next to FIG. 5, a flowchart is shown for calculating a projected cost for each of the one or more potential flight plans. The operations illustrated in FIG. 5 may, for example, be performed by, with the assistance of, and/or under the control of an apparatus (e.g., flight management server 300), as described above. In this regard, performance of the operations may invoke one or more of processor 301, memory 302, communications circuitry 303, input/output circuitry 304, flight plan circuitry 305, and/or display circuitry 306.

As shown in operation 505, the apparatus (e.g., flight management server 300) includes means, such as processor 301, communications circuitry 303, flight plan circuitry 305, or the like for accessing cost data associated with each of the one or more flight plan segments. In an example embodiment, accessing cost data associated with each of the one or more flight plan segments comprises querying an operational cost repository based upon at least one or more of the originating location, the destination location, one or more waypoints associated with each of the one or more flight plan segments, and equipment data. The results of such query may include cost data comprising at least one of airspace usage data, airport usage data, pollution data, and equipment usage data. For example, the boundaries of a particular airspace may be defined by a plurality of latitude and longitude coordinates and the cost of operation within such defined airspace boundaries may be stored in the operational cost repository. In one non-limiting example, querying an operational cost repository could be based upon the waypoints (e.g., particular latitude and longitude coordinates) associated with a flight plan segment to determine the relevant airspace and the associated cost of operation within that airspace.

Airspace usage data corresponds to charge(s) that may be imposed by a regulating authority, such as the government of a country, for allowing an aircraft to navigate through or otherwise utilize the airspace controlled or operated by such country. The amount charged as well as the rules and regulations used to determine an airspace usage charge may vary by country. Airspace usage charges may also be variable and/or be updated based on a number of factors, such as regulatory authority determination(s), time of year, time of day, weather conditions, traffic conditions, political conditions, and/or the like. In a non-limiting example, increased travel and air traffic during summer months and/or holidays may correspond to increased airspace usage charges during such time period(s). An airspace usage charge may be a specific charge amount in some embodiments. In still other embodiments, the airspace usage charge may be an algorithm or calculation to be calculated by the apparatus.

Airport usage data corresponds to charge(s) that may be imposed by a regulating authority, such as the government of a country or the operator of an airport, for utilizing such airport as an originating or destination airport. The amount charged for utilizing an airport varies from airport to airport. For example, some of the most accessible airports are heavily-crowded and receiving clearance to land is a tedious task. The airport usage charge associated with such popular airports may be greater in comparison to less-crowded alternate airports. In one embodiment, it is contemplated that the apparatus (e.g., flight management server 300) includes means, such as processor 301, flight plan circuitry 305, or the like for determining an updated destination location (e.g., a new destination airport) and revising an existing flight plan to replace the destination location with the updated destination location, such that the revised flight plan corresponds to a lower aggregate cost than the existing flight plan. Airport usage charges may also be variable and/or be updated based on a number of factors, such as regulatory authority determination(s), time of year, time of day, weather conditions, traffic conditions, political conditions, and/or the like. In a non-limiting example, inclement weather conditions may generate increased traffic at a specific airport and may correspond to increased airport usage charges. An airport usage charge may be a specific charge amount in some embodiments. In still other embodiments, the airport usage charge may be an algorithm or calculation to be calculated by the apparatus.

Pollution data corresponds to charge(s) that may be imposed by a regulating authority, such as a government of a country or a state, to account for, reduce, or otherwise mitigate pollution associated with aircraft. One example of pollution data corresponds to charge(s) imposed for carbon dioxide emissions associated with an aircraft. The carbon dioxide emitted by the engine(s) of an aircraft may affect the ecosystem(s) of the countries, states, etc. over which an aircraft travels during a flight plan and governments may levy taxes associated with such carbon dioxide emissions. Pollution charges associated with carbon dioxide emissions may also be variable and/or be updated based on a number of factors, such as regulatory authority determination(s), time of year, time of day, weather conditions, traffic conditions, political conditions, and/or the like. In a non-limiting example, increased travel and air traffic during summer months and/or holidays may correspond to increased pollution charges associated with carbon dioxide emissions. A pollution charge may be a specific charge amount in some embodiments. In still other embodiments, the pollution charge may be determined based on one or more factors inserted in an algorithm or calculation to be calculated by the apparatus. For example, the amount of carbon dioxide emitted by an aircraft and/or its engine(s) may vary based upon a plurality of factors, such as thrust, pay load, velocity, altitude, and/or other factors affecting fuel consumption (e.g., increase fuel consumption corresponds to increased carbon dioxide emissions). In a non-limiting example, the apparatus may access cost data corresponding to pollution data from the operating cost repository for one or more flight segments and determine the flight-specific cost data associated with each of the one or more flight segments by further accessing navigation data associated with the aircraft from the navigation repository, such as estimated fuel usage (e.g., estimated fuel burn), and calculating an adjusted cost data value for each of the one or more flight segments based upon at least the cost data (e.g., pollution data) and the navigation data (e.g. estimated fuel usage). For example, in some embodiments, such the pollution data may provide a pollution multiplier to be applied to the sum of the estimated fuel usage for the associated flight segment. The resulting pollution charge for each flight segment may be aggregated to determine a total pollution charge for the corresponding flight plan.

Another example of pollution data corresponds to charge(s) imposed for noise pollution or noise emissions associated with an aircraft. Regulating authorities, such as governments or airports, may pass noise pollution charges associated with aircraft and/or an airport on to the airlines operating aircraft flying into or out of such airports. Pollution charges associated with noise pollution may also be variable and/or be updated based on a number of factors, such as regulatory authority determination(s), time of year, time of day, traffic conditions, political conditions, and/or the like. In a non-limiting example, noise pollution charges imposed during periods of time corresponding to higher-traffic (e.g., morning through evening) may be lesser than noise pollution charges imposed during periods of time corresponding to lower-traffic (e.g., early morning, overnight, etc.). In another non-limiting example, noise pollution charges imposed during overnight periods may be greater than noise pollution charges imposed during the daytime. A noise pollution charge may be a specific charge amount in some embodiments. In still other embodiments, the noise pollution charge may be determined based on one or more factors inserted in an algorithm or calculation to be calculated by the apparatus.

Equipment usage data corresponds to charge(s) that may be imposed by a regulating authority, such as a government of a country or a state, to account for the use of certain aircraft equipment. In a non-limiting example, equipment of military origin or of higher performance may be restricted in certain countries or respective airspaces. Such equipment of military origin or higher performance may be allowed in such countries/airspaces with the payment of an associated equipment usage fee, such as an equipment entry fee.

In some embodiments, cost exceptions are accounted for in the cost data retrieved from the external device, such as the repository associated with regulatory agency. In other embodiments, accessing cost data associated with each of the one or more flight plan segments comprises determining whether a cost exception is satisfied such that accessing cost data associated with each of the one or more flight plan segments comprises accessing subsidized cost data associated with each of the one or more flight plan segments. Certain embodiments contemplate the relationship, status, and/or privilege associated with an airline. In a non-limiting example, an airline carrier may be provided or awarded cost exceptions to certain cost data (e.g., subsidized cost data) when one or more of its aircraft traverses airspace controlled by a country or regulating authority. Said differently, if a first country has bilateral relations and/or an agreement with a second country, airline carriers associated with the first country may be provided a subsidy or cost exception for airspace usage charges, airport usage charges, and/or the like when their aircraft utilize airspace controlled by the second country. A cost exception is satisfied in such an instance when an entity associated with the aircraft (e.g., the airline carrier) is associated with a privilege classification (e.g., privy to the bilateral relations/agreement between two regulating authorities). In another non-limiting example, airline carriers associated with a third country may not be provided such a subsidy or cost exception when their aircraft utilize airspace controlled by the second country if the third country does not have bilateral relations and/or an agreement with the second country. A cost exception is not satisfied in such an instance when an entity associated with the aircraft (e.g., the airline carrier) is not associated with a privilege classification (e.g., not privy to a bilateral relations/agreement between two regulating authorities).

The provided examples of cost data are non-limiting and it is contemplated that additional and/or other sources of cost impacting factors may be introduced or imposed in the future are encompassed by the embodiments disclosed herein.

Returning to FIG. 5, as shown in operation 510, the apparatus (e.g., flight management server 300) includes means, such as processor 301, flight plan circuitry 305, or the like for determining flight-specific cost data associated with each of the one or more flight plan segments based upon at least the cost data. As described hereafter with reference to FIG. 6, determining flight-specific cost data associated with each of the one or more flight plan segments may comprise accessing navigation data associated with the aircraft and calculating an adjusted cost data value for each of the one or more flight plan segments based upon at least the cost data and the navigation data. It is also contemplated that the apparatus could estimate or determine an adjusted cost data value for each of the flight segments based on an evaluation of historical data. For example, in some embodiments, relationships may be identified among cost data, navigation data, historical adjusted cost data values, and/or the like. In still further embodiments, such relationships may be programmatically determined based on one or more trained machine learning models. For example, the apparatus may implement an unsupervised learning structure, a supervised learning structure, a reinforcement learning structure, a deep learning structure, and/or the like for utilizing relationships established among the various cost parameters.

Thereafter, as shown in operation 515, the apparatus (e.g., flight management server 300) includes means, such as processor 301, flight plan circuitry 305, or the like, for aggregating the flight-specific cost data associated with each of the one or more flight plan segments forming each of the one or more potential flight plans. For example, after the flight-specific cost data for each flight segment is determined as explained below with respect to FIG. 6, such flight-specific data may be aggregated (e.g., summed) to determine a total charge for the corresponding flight plan.

Turning next to FIG. 6, a flowchart is shown for determining flight-specific cost data associated with each of the one or more flight plan segments. The operations illustrated in FIG. 6 may, for example, be performed by, with the assistance of, and/or under the control of an apparatus (e.g., flight management server 300), as described above. In this regard, performance of the operations may invoke one or more of processor 301, memory 302, communications circuitry 303, input/output circuitry 304, flight plan circuitry 305, and/or display circuitry 306.

As shown in operation 605, the apparatus (e.g., flight management server 300) includes means, such as processor 301, flight plan circuitry 305, or the like, for accessing navigation data associated with the aircraft. In an example embodiment, navigation data may be stored in a navigation repository. In certain embodiments, navigation data comprises data generated by or relevant to an aircraft. In some embodiments, navigation data comprises one or more of fuel data, velocity data, altitude data, weather data, airport data, equipment data, time data, and/or the like.

In some embodiments, fuel data comprises one or more of cost of fuel, estimated fuel usage, and actual fuel usage. In certain embodiments, equipment data comprises information associated with the type and age of aircraft equipment and components associated with a specific aircraft. In some embodiments, equipment data may comprise information associated with performance variables corresponding to aircraft equipment and components associated with a specific aircraft. In still further embodiments, such performance variables correspond to actual noise emission levels as measured and associated with one or more engines associated with the aircraft, such as during maintenance and/or regulatory certification screenings.

As shown in operation 610, the apparatus (e.g., flight management server 300) includes means, such as processor 301, flight plan circuitry 305, or the like, for calculating an adjusted cost data value for each of the one or more flight plan segments based upon at least the cost data and the navigation data. For example, an aircraft may produce varying amounts of carbon dioxide emissions when navigating a flight plan. For example, the amount of fuel burned (e.g. level of carbon dioxide emissions) associated with a first flight plan segment corresponding to take-off (e.g. climbing to a cruising altitude) may be greater than a second flight plan segment corresponding to an aircraft operating at cruising altitude. Said differently, cost data associated with carbon dioxide emissions may be adjusted to account for increased carbon dioxide emissions during ascent and descent of an aircraft as compared to carbon dioxide emissions incurred during cruising altitudes. Still further, in some embodiments, differing cost data (e.g., pollution data) may be required depending on the corresponding airspace. For example, flight segments associated with the ascent of an aircraft may correspond to airspace controlled by a first country or regulating authority and flight segments associated with the cruising profile of an aircraft may correspond to an airspace controlled by a second country or regulating authority.

In a non-limiting example, the make, model, and/or general age of an engine may be used to calculate an adjusted cost data value and may alter such determinations. For example, an older engine may be associated with increased noise pollution values (e.g., with or without actual testing of the specific engine) and may require cost adjustment to account for increased noise pollution. Similarly, certain engine models may be associated with increased carbon emissions (e.g., with or without actual testing of the specific engine) and may require cost adjustment to account for increased carbon dioxide emissions.

As indicated with respect to the cost data, charges associated with cost data may be variable based on a number of factors, such as regulatory authority determination(s), time of year, time of day, weather conditions, traffic conditions, political conditions, and/or the like. In some embodiments, the accessed cost data may not be the most current cost data.

In other embodiments, the accessed cost data may not be a static charge amount (e.g., an algorithm or rules for calculating the cost data based upon dynamic data such as time of year, time of day, weather conditions, traffic conditions, political conditions, and/or the like). In some embodiments, calculating an adjusted cost data value for each of the one or more flight plan segments comprises accounting for carbon dioxide emissions charges associated with time of year data. In certain embodiments, calculating an adjusted cost data value for each of the one or more flight plan segments comprises accounting for noise emissions charges associated with time of day data.

Calculating an adjusted cost data value for each of the one or more flight segments may include calculating an adjusted cost data value for one or more charges for each of the one or more flight segments. For example, as discussed above, the pollution data may provide a pollution multiplier to be applied to the sum of the estimated fuel usage for a particular flight segment. Similarly, the airspace charge may provide a static amount associated with the particular flight segment corresponding to the associated flight time. Other cost data may also be adjusted for the particular flight segment, such as noise pollution data, airport usage charge, and/or the like. A sum of the relevant adjusted cost data values for the particular flight segment may be determined.

As shown in operation 615, the apparatus (e.g., flight management server 300) includes means, such as processor 301, flight plan circuitry 305, or the like, for assigning the adjusted cost data value as the flight-specific cost data associated with each of the one or more flight plan segments. For example, the sum of the relevant adjusted cost data values for the particular flight segment may be assigned as the flight-specific cost data for the particular flight segment.

Accordingly, it is contemplated that although the apparatus (e.g., flight management server 300) may determine the same potential flight plan from an originating location to a destination location for two different aircraft (e.g., same make/model of engine but with differing age, or same make/model/age but different airlines), it may not be the optimal flight plan for both aircraft as a result of differing projected costs associated with the flight plan.

Additionally, or alternatively, it is contemplated by the present disclosure that accessing, calculating, and aggregating such cost data, navigation data, and adjustment values provides more robust operating cost data for improved assessment and calculation of ticket prices, cargo fees, and similar charges to be imposed by an airline.

As described above, various technical challenges are surmounted via technical solutions contemplated herein. For instance, example implementations of embodiments of the present disclosure determine and/or revise a flight plan of the aircraft that accounts for connected cost data that may be incurred. In this way, the inventors have identified solutions for reducing operating costs of an airline that were historically unavailable. In doing so, such example implementations confront and solve at least two technical challenges: (1) providing flight plans optimized for cost-efficiency (e.g., thereby lowering overall operating costs), and (2) providing more robust operating cost data for improved assessment and calculation of ticket prices, cargo fees, and similar charges to be imposed by an airline.

FIGS. 4-6 thus illustrate flowcharts describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 302 of the flight management server 300 and executed by a processor 301 of the flight management server 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for determining a flight plan for an aircraft comprising:
   determining one or more potential flight plans from an originating location to a destination location, each potential flight plan comprising a different combination of one or more flight plan segments forming a potential flight plan from the originating location to the destination location;

calculating a projected cost data value for each of the one or more potential flight plans based at least in part on carbon dioxide emissions charges associated with time of year data for each of the one or more potential flight plans;

determining an optimal flight plan from among the one or more potential flight plans; and displaying a visual representation of the optimal flight plan to a user interface.

2. The method of claim 1, wherein calculating the projected cost data value for each of the one or more potential flight plans comprises:

accessing cost data from one or more of the dynamic fuel consumption data, the pollution data, the equipment usage data, the navigation data, or the combination thereof, for each of the associated with each of the one or more flight plan segments;

determining flight-specific cost data associated with each of the one or more flight plan segments based upon at least the cost data; and for each of the one or more potential flight plans, aggregating the flight-specific cost data associated with each of the one or more flight plan segments forming such potential flight plan.

3. The method of claim 2, wherein accessing the cost data associated with each of the one or more flight plan segments comprises:

querying a repository based upon at least one or more of the originating location, the destination location, one or more waypoints associated with each of the one or more flight plan segments, and equipment data.

4. The method of claim 2, wherein accessing the cost data associated with each of the one or more flight plan segments comprises:

determining whether a cost exception is satisfied such that accessing cost data associated with each of the one or more flight plan segments comprises accessing subsidized cost data associated with each of the one or more flight plan segments.

5. The method of claim 4, wherein the cost exception is satisfied in an instance where an entity associated with the aircraft is associated with a privilege classification.

6. The method of claim 4, wherein the cost exception is not satisfied in an instance where an entity associated with the aircraft is not associated with a privilege classification.

7. The method of claim 2, wherein determining flight-specific cost data associated with each of the one or more flight plan segments comprises:

accessing navigation data associated with the aircraft;

calculating an adjusted cost data value for each of the one or more flight plan segments based upon at least the cost data and the navigation data; and assigning the adjusted cost data value as the flight-specific cost data associated with each of the one or more flight plan segments.

8. The method of claim 1, wherein the pollution data comprises at least one of carbon dioxide emissions data and noise emissions data.

9. The method of claim 7, wherein the navigation data comprises at least one of cost of fuel, estimated fuel usage, and actual fuel usage.

10. The method of claim 7, wherein calculating an adjusted cost data value for each of the one or more flight plan segments comprises accounting for changes in carbon dioxide emissions charges associated with one or more changes in an altitude of the aircraft.

11. The method of claim 9, wherein a first flight segment is associated with an increase in the altitude of the aircraft and a second flight segment is associated with no change in the altitude of the aircraft, the estimated fuel usage associated with the first flight plan segment greater than the estimated fuel usage associated with the second flight plan segment.

12. The method of claim 7, wherein calculating the adjusted cost data value for each of the one or more flight plan segments comprises determining the carbon dioxide emissions charges associated with the time of year data.

13. The method of claim 7, wherein calculating the adjusted cost data value for each of the one or more flight plan segments comprises determining noise emissions charges associated with time of day data.

14. The method of claim 7, wherein the navigation data comprises equipment data and calculating an adjusted cost data value for each of the one or more flight plan segments comprises accounting for a performance variable corresponding to equipment associated with the aircraft.

15. The method of claim 14, wherein the performance variable corresponds to actual noise emission levels associated with one or more engines associated with the aircraft.

16. The method of claim 1, wherein the visual representation of the optimal flight plan is displayed in conjunction with at least one other flight plan corresponding to a shortest distance between the originating location and the destination location, the method further comprising receiving user input indicating a user selection of the optimal flight plan.

17. The method of claim 1, wherein the originating location is a current location of the aircraft traversing an existing flight plan and the existing flight plan is different than the optimal flight plan, the method further comprising:

receiving input indicating a selection of the optimal flight plan such that the aircraft halts traversing the existing flight plan and commences traversing the selected optimal flight plan.

18. An apparatus configured to determine a flight plan for an aircraft, the apparatus comprising:

at least one processor and at least one non-transitory memory including program code, the at least one non-transitory memory and the program code configured to, with the processor, cause the apparatus to at least:

determine one or more potential flight plans from an originating location to a destination location, each potential flight plan comprising a different combination of one or more flight plan segments forming a potential flight plan from the originating location to the destination location;

calculate a projected cost data value for each of the one or more potential flight plans based at least in part on carbon dioxide emissions charges associated with time of year data for each of the one or more potential flight plans;

determine an optimal flight plan from among the one or more potential flight plans; and display a visual representation of the optimal flight plan to a user interface.

19. The apparatus of claim 18, wherein the navigation data comprises equipment data and calculating an adjusted cost data value for each of the one or more flight plan segments comprises determining a performance variable corresponding to equipment associated with the aircraft.

20. A computer program product comprising at least one non-transitory computer-readable storage medium having computer-readable program code portions stored therein, the computer-readable program code portions comprising an executable portion configured to:
- determine one or more potential flight plans from an originating location to a destination location, each potential flight plan comprising a different combination of one or more flight plan segments forming a potential flight plan from the originating location to the destination location;
- calculate a projected cost data value for each of the one or more potential flight plans based at least in part on carbon dioxide emissions charges associated with time of year data for each of the one or more potential flight plans;
- determine an optimal flight plan from among the one or more potential flight plans; and
- display a visual representation of the optimal flight plan to a user interface.

* * * * *